(12) United States Patent
Liu et al.

(10) Patent No.: US 8,427,425 B2
(45) Date of Patent: *Apr. 23, 2013

(54) POINTING DEVICES FOR CONTROLLING MOVEMENT OF A CURSOR IN A COMPUTER SYSTEM AND ASSOCIATED SYSTEMS

(75) Inventors: Sen-Hsiang Liu, Taipei (TW); Huang-Feng Huang, Dongguan (TW); Hai-Bing Fu, Dongguan (TW)

(73) Assignee: Transpacific Plasma, LLC, Wilmington, DE (US)

( * ) Notice: Subject to any disclaimer, the term of this patent is extended or adjusted under 35 U.S.C. 154(b) by 314 days.

This patent is subject to a terminal disclaimer.

(21) Appl. No.: 12/405,835

(22) Filed: Mar. 17, 2009

(65) Prior Publication Data

US 2009/0195502 A1 Aug. 6, 2009

Related U.S. Application Data

(63) Continuation of application No. 11/203,691, filed on Aug. 15, 2005, now Pat. No. 7,525,532.

(30) Foreign Application Priority Data

Jun. 24, 2005 (TW) .............................. 94121114 A

(51) Int. Cl.
*G09G 5/00* (2006.01)
*G06F 3/033* (2006.01)

(52) U.S. Cl.
USPC .......................................... 345/156; 345/163

(58) Field of Classification Search ........... 345/156–167
See application file for complete search history.

(56) References Cited

U.S. PATENT DOCUMENTS

| 5,428,368 | A | 6/1995 | Grant |
| 5,691,747 | A | 11/1997 | Amano |
| 6,198,473 | B1 | 3/2001 | Armstrong |
| 6,348,913 | B1 * | 2/2002 | Cho .............................. 345/163 |
| 6,518,954 | B1 * | 2/2003 | Chen ............................. 345/161 |
| 6,879,316 | B2 | 4/2005 | Kehlstadt et al. |
| 7,042,441 | B2 | 5/2006 | Adams et al. |

(Continued)

FOREIGN PATENT DOCUMENTS

TW I1267772 12/2006

OTHER PUBLICATIONS

United States Patent and Trademark Office, Non-Final Office Action, U.S. Appl. No. 11/203,691, mailed Aug. 5, 2008, 10 pages.

(Continued)

*Primary Examiner* — Rodney Amadiz

(57) ABSTRACT

A pointing device is communicated with a computer system for controlling movement of a cursor shown on a display screen of the computer system. The pointing device includes a housing and a scroll wheel assembly. The housing has an opening therein. The scroll wheel assembly is positioned within the opening of the housing and a portion thereof protrudes away from the outer surface of the housing. The scroll wheel assembly includes a rotatable member, a soft member covering the rotatable member, and a sensing member arranged between the rotatable member and the soft member. The sensing member is actuated in response to deformation of the soft member when a lateral force is applied on the soft member, thereby controlling lateral movement of the cursor.

20 Claims, 4 Drawing Sheets

U.S. PATENT DOCUMENTS

| | | | |
|---|---|---|---|
| 7,079,110 B2 | 7/2006 | Ledbetter et al. | |
| 7,283,122 B2 | 10/2007 | Bohn et al. | |
| 7,525,532 B2 | 4/2009 | Liu et al. | |
| 2001/0043149 A1 | 11/2001 | Chan | |
| 2002/0158844 A1 | 10/2002 | McLoone et al. | |
| 2004/0001042 A1 | 1/2004 | Lindhout et al. | |
| 2004/0001045 A1* | 1/2004 | Hu | 345/163 |
| 2004/0051392 A1* | 3/2004 | Badarneh | 307/112 |
| 2004/0174336 A1 | 9/2004 | Bohn | |
| 2004/0252107 A1 | 12/2004 | Tsai et al. | |
| 2005/0162404 A1 | 7/2005 | Chiu et al. | |
| 2005/0179655 A1 | 8/2005 | Ludwig | |
| 2005/0179661 A1* | 8/2005 | Bohn | 345/163 |
| 2006/0044257 A1 | 3/2006 | Chou | |
| 2006/0109246 A1 | 5/2006 | Lee et al. | |
| 2006/0290655 A1 | 12/2006 | Chou | |
| 2007/0159462 A1 | 7/2007 | Yen et al. | |

OTHER PUBLICATIONS

United States Patent and Trademark Office, Notice of Allowance, U.S. Appl. No. 11/203,691, mailed Dec. 15, 2008, 12 pages.

* cited by examiner

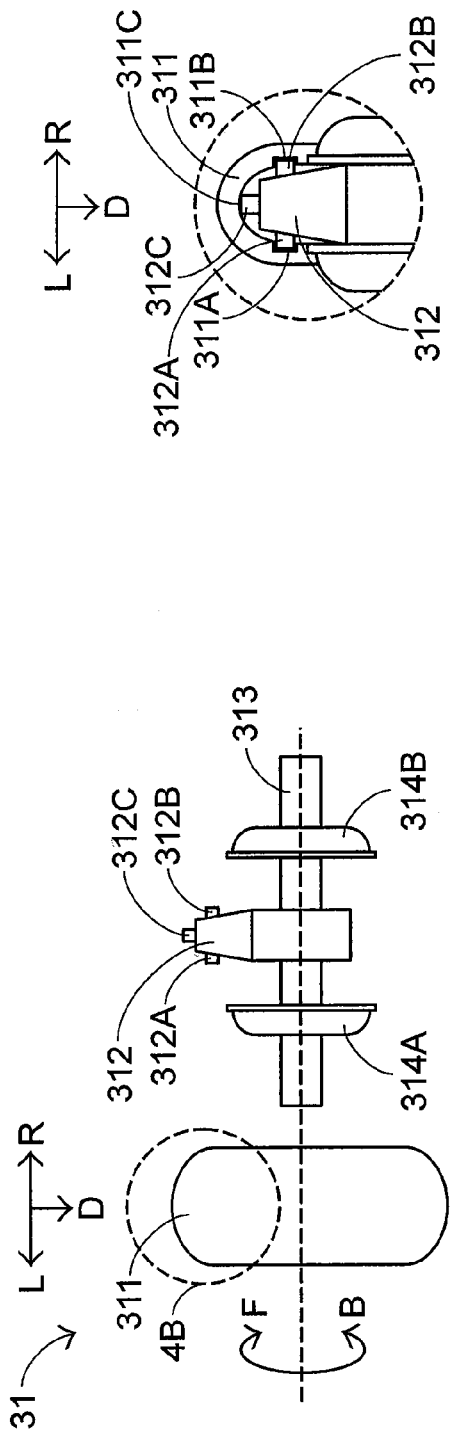
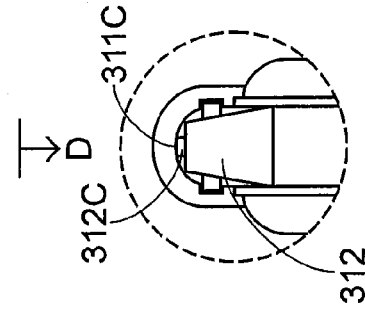
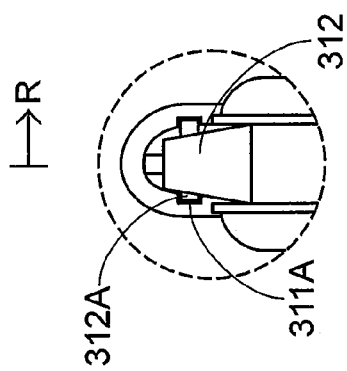
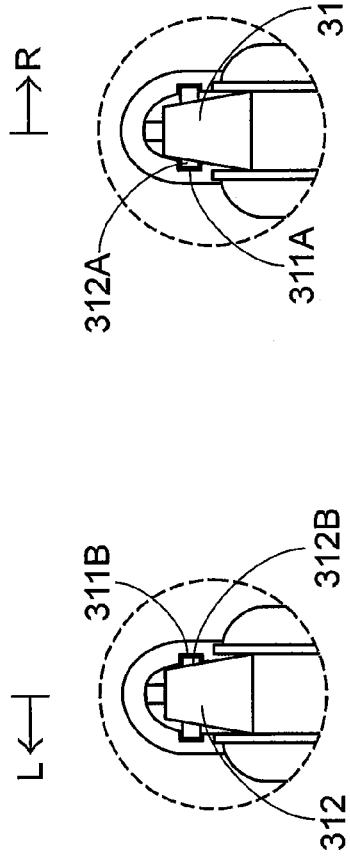

POINTING DEVICES FOR CONTROLLING MOVEMENT OF A CURSOR IN A COMPUTER SYSTEM AND ASSOCIATED SYSTEMS

CROSS-REFERENCE TO RELATED APPLICATIONS

This application is a continuation of U.S. patent application Ser. No. 11/203,691, filed Aug. 15, 2005, now U.S. Pat. No. 7,525,532, and incorporated herein by reference in its entirety.

BACKGROUND OF THE INVENTION

1. The Field of the Invention

The present invention relates to the pointing device, and more particularly to a pointing device for scrolling an image on a display screen, controlling lateral movement of a cursor and generating a setting signal.

2. The Relevant Technology

Pointing devices such as mice have been widely employed in computer systems or other electronic apparatuses equipped with a display screen so as to control movement of a cursor on the display screen or scroll an image relative to the display screen. In addition, the pointing device may be actuated to generate responsive setting signals to conduct further data processing operations. As known, a scroll wheel assembly is usually provided on a pointing device and used by the computer operators to scroll an image relative to the display screen. Since the scroll wheel assembly is rotatable in either a forward direction or a backward direction, the image would be scrolled upwards or downwards. For a purpose of controlling movement of the cursor by the scroll wheel assembly, another type of pointing device with a sensing member on either or both sides of the scroll wheel assembly was developed. An example of the sensing member is a strain gauge. By laterally stirring the scroll wheel assembly, the sensing member is actuated to generate a control signal. In response to the control signal, the cursor shown on the display screen would be located to move in the left or right direction accordingly.

This pointing device, however, has several drawbacks. For example, since the sensing member is typically arranged on bilateral sides or peripheries of the scroll wheel assembly, the overall volume of the pointing device fails to meet the growing requirement of minimization. In addition, the approach of laterally stirring the scroll wheel assembly may lead to excessive swing amplitude, and thus the scroll wheel assembly is hard to be precisely controlled.

BRIEF SUMMARY OF THE INVENTION

As previously described, since the sensing member is typically arranged on bilateral sides or peripheries of the scroll wheel assembly, the overall volume of the pointing device fails to meet the increasing requirement of minimization. In addition, the approach of laterally stirring the scroll wheel assembly may lead to excessive swing amplitude, and thus the scroll wheel assembly is hard to be precisely controlled. In views of the above-described disadvantages resulted from the prior art, the applicant keeps on carving unflaggingly to develop a pointing device according to the present invention through wholehearted experience and research.

It is an object of the present invention to provide a pointing device capable of precisely controlling lateral movements of the cursor shown on the display screen without largely increasing overall volume of the pointing device.

In accordance with a first aspect of the present invention, there is provided a pointing device. The pointing device comprises a housing and a scroll wheel assembly. The housing has an opening therein. The scroll wheel assembly is positioned within the opening of the housing and a portion thereof protrudes away from the outer surface of the housing. The scroll wheel assembly comprises a rotatable member, a soft member covering the rotatable member, and a sensing member arranged between the rotatable member and the soft member. The sensing member is actuated in response to deformation of the soft member.

In accordance with a second aspect of the present invention, there is provided a pointing device communicated with a computer system for controlling movement of a cursor shown on a display screen of the computer system. The pointing device comprises a housing and a scroll wheel assembly. The scroll wheel assembly is positioned within the opening of the housing and a portion thereof protrudes away from the outer surface of the housing. The scroll wheel assembly comprises two rotor disks disposed on opposite sides of a shaft, a sensing member arranged between the two rotor disks, and a soft member covering the rotatable member and portions of the rotor disks. The sensing member is actuated to generate a leftward control signal to control a leftward movement of the cursor when a leftward external force is applied to deform the soft member. The sensing member is actuated to generate a rightward control signal to control a rightward movement of the cursor when a rightward external force is applied to deform the soft member.

The above objects and advantages of the present invention will become more readily apparent to those ordinarily skilled in the art after reviewing the following detailed description and accompanying drawings, in which:

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 4A is a schematic exploded view illustrating a scroll wheel assembly of a pointing device according to a third preferred embodiment of the present invention;

FIG. 4B is a schematic partial enlarged cross-sectional view illustrating the scroll wheel assembly of FIG. 4A after be assembled; and FIGS. 4C-4E are schematic views illustrating leftward, rightward and downward movements of the scroll wheel assembly shown in FIG. 4B, respectively.

DETAILED DESCRIPTION OF THE PREFERRED EMBODIMENTS

Figure 1:
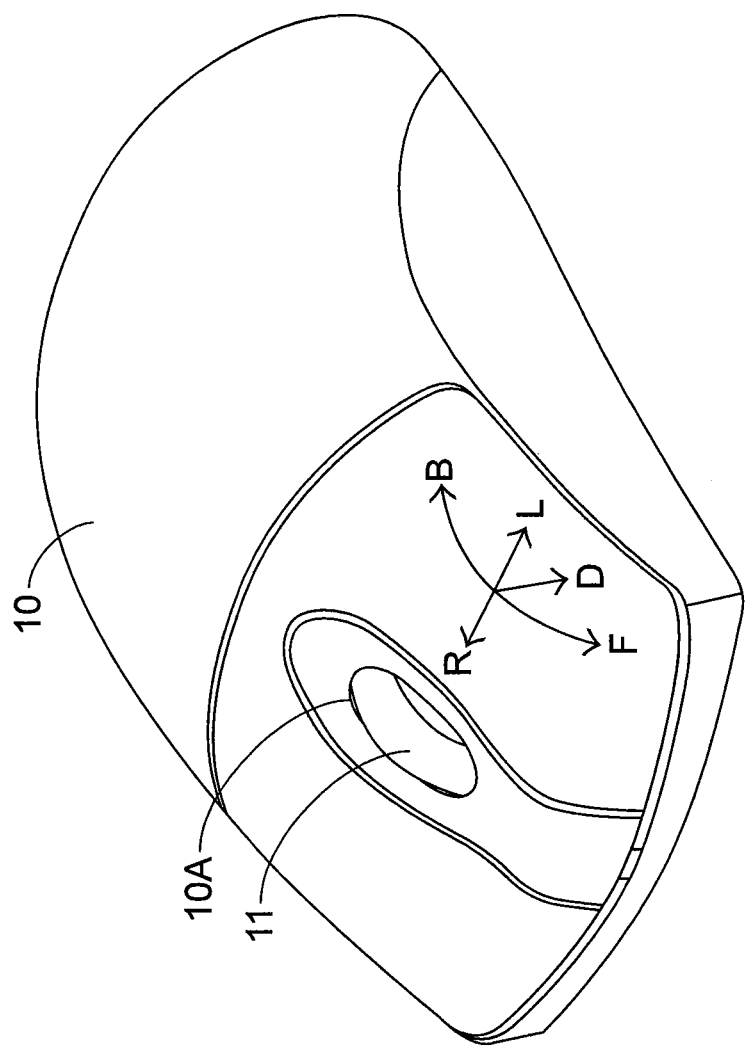
FIG. 1 a schematic perspective view illustrating a pointing device according to the present invention.

The present invention will now be described more specifically with reference to the following embodiments. It is to be noted that the following descriptions of preferred embodiments of this invention are presented herein for the purpose of illustration and description only. It is not intended to be exhaustive or to be limited to the precise form disclosed. The schematic drawings, not to scale, are employed to illustrate the specific features of the present invention. In addition, the elements or structures in the drawings are not limited to the precise form disclosed. Unless specifically stated, the individual elements may be extensive to include multiple elements or structures.

The present invention relates to a pointing device communicable to and a computer system or an electronic apparatus with a display screen, thereby outputting a control signal to control lateral movement of a cursor or scroll an image on the display screen.

Referring to FIG. 1, a schematic perspective view of a pointing device according to the present invention is shown. The pointing device 1 comprises a housing 10 and a scroll wheel assembly 11. The housing 10 has an opening 10A therein. The scroll wheel assembly 11 is positioned within the opening 10A of the housing 10, and a portion of the wheel 11 protrudes away from the outer surface of the housing 10 such that the scroll wheel assembly 11 can be contacted and manipulated by a user. The scroll wheel assembly 11 of the pointing device 1 can be rotated forwardly (as shown in the arrow F) or backwardly (as shown in the arrow B), thereby scrolling the image shown on the display screen upwardly and downwardly. In addition, the scroll wheel assembly 11 can be moved laterally when an external force is applied on the scroll wheel assembly 11 leftwards (as shown in the arrow L) or rightwards (as shown in the arrow R). In response to the external force, the scroll wheel assembly 11 is deformed such that a sensing member (not shown) within the housing 10 is actuated to generate a signal to control lateral movement of the cursor on the display screen.

Figure 2A:
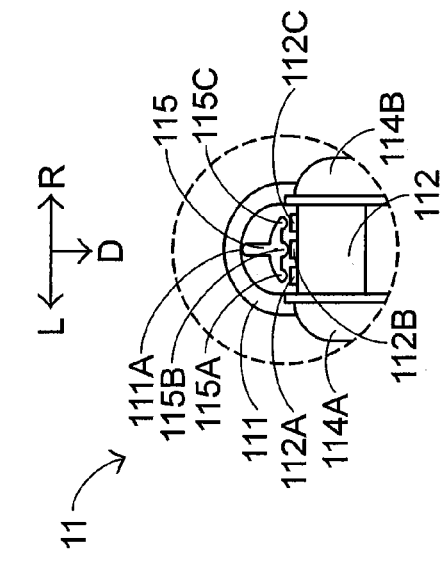
FIG. 2A is a schematic exploded view illustrating a scroll wheel assembly of a pointing device according to a first preferred embodiment of the present invention.
Figure 2B:
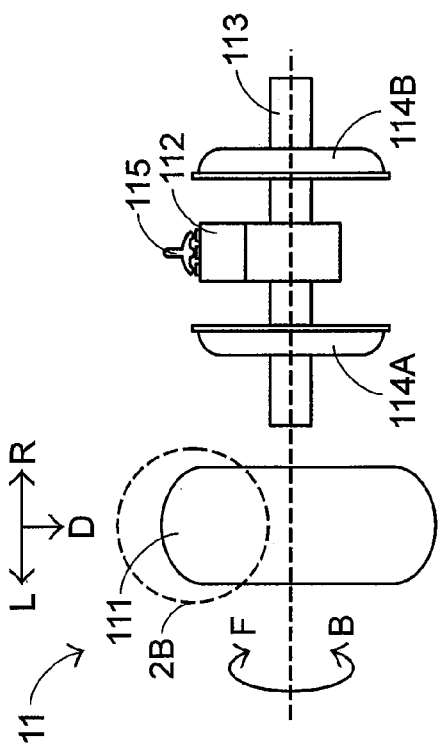
FIG. 2B is a schematic partial enlarged cross-sectional view illustrating the scroll wheel assembly of a FIG. 2A after be assembled.

Please refer to FIGS. 2A and 2B, which are a schematic exploded view and a partial enlarged cross-sectional view of a scroll wheel assembly used in the pointing device according to a first preferred embodiment of the present invention, respectively. The scroll wheel assembly 11 comprises a rotatable member, a soft member 111, a sensing member 112 and a lever member 115. The rotatable member includes two rotor disks 114A and 114B, which are disposed on opposite sides of a shaft 113. The soft member 111 can be contacted by the user's finger. The sensing member 112 is arranged between the rotatable member and the soft member 111. Moreover, the sensing member 112 is arranged between the rotor disks 114A and 114B, and includes three coplanar pressure sensing elements 112A, 112B and 112C. In this embodiment, the lever member 115 is in a shape of a trident, and includes three supporting posts 115A, 115B and 115C corresponding to the pressure sensing elements 112A, 112B and 112C, respectively. Once the scroll wheel assembly 11 is fabricated as shown in FIG. 2B, the sensing member 112, the lever member 115 and portions of the rotor disks 114A and 114B are covered by the soft member 111.

Figure 2C:
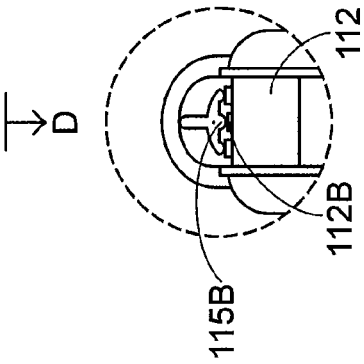
FIGS. 2C-2E are schematic views illustrating leftward, rightward and downward movements of the scroll wheel assembly shown in FIG. 2B, respectively.
Figure 2D:
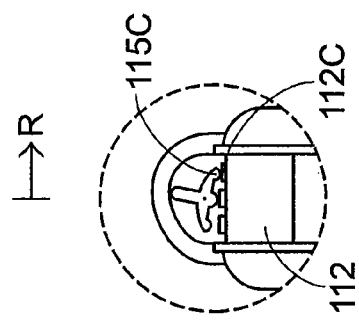
Figure 2E:
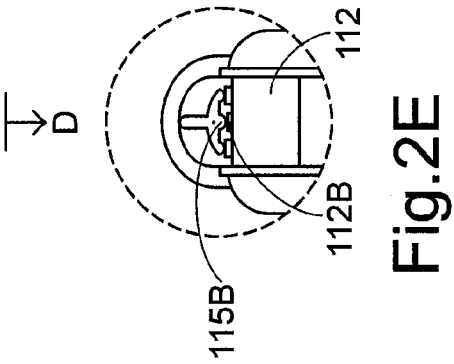

The principle of controlling lateral movement of the cursor in response to the control signal generated from stirring actions of the scroll wheel assembly 11 will be illustrated with reference to FIGS. 2C and 2D. When an external force is applied on the soft member 111 leftwards (as shown in the arrow L) or rightwards (as shown in the arrow R), the lever member 115 is inclined to the left or right side, respectively. Under this circumstance, the pressure sensing elements 112A and 112C are actuated by corresponding supporting posts 115A and 115C so as to generate corresponding control signals for controlling leftward and rightward movement of the cursor, respectively. Furthermore, once the user depresses down the soft member 111 in the direction D, as shown in FIG. 2E, the lever member 115 would be pressed down such that the central pressure sensing element 112B is actuated by corresponding supporting post 115B. Under this circumstance, the pointing device would generate a setting signal for conducting other data processing operations.

Figure 3A:
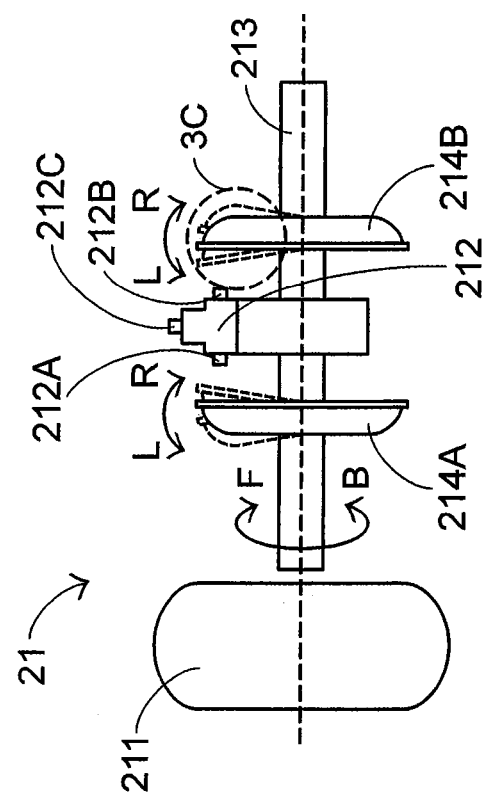
FIG. 3A is a schematic exploded view illustrating a scroll wheel assembly of a pointing device according to a second preferred embodiment of the present invention.

A second embodiment of a pointing device is also communicable to a computer system or an electronic apparatus with a display screen, thereby controlling lateral movement of a cursor or scrolling an image on the display screen in response to a control signal. The scroll wheel assembly 21 used in this embodiment will be illustrated with reference to FIGS. 3A.about.3C. As shown in FIG. 3A, the scroll wheel assembly 21 comprises a rotatable member, a soft member 211 and a sensing member 212. The rotatable member includes two rotor disks 214A and 214B disposed on opposite sides of a shaft 213 and made of flexible material. The soft member 211 can be contacted by the user's finger. The sensing member 212 is arranged between the rotatable member and the soft member 211. Once the scroll wheel assembly 21 is fabricated as shown in FIG. 3B, the sensing member 212 and portions of the rotor disks 214A and 214B are covered by the soft member 211.

Figure 3C:
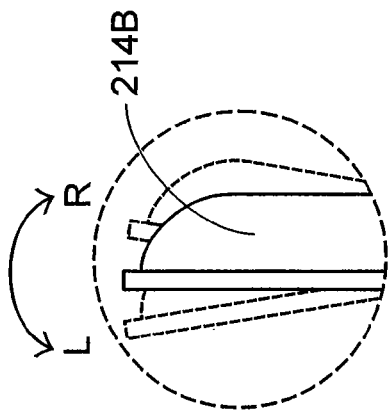
FIG. 3C is a schematic partial enlarged view illustrating the scroll wheel assembly of a FIG. 3A.
Figure 3B:
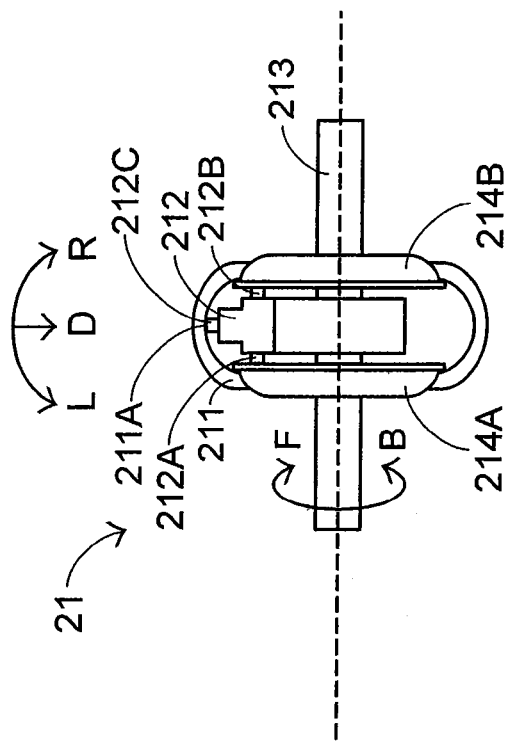
FIG. 3B is a cross-sectional view illustrating the scroll wheel assembly of FIG. 3A after be assembled.

FIG. 3B is a cross-sectional view illustrating the scroll wheel assembly of the pointing device according to this embodiment. The sensing member 212 includes two pressure sensing elements 212A and 212B facing to the rotor disks 214A and 214B, respectively. The pressure sensing elements 212A and 212B may be in contact with the rotor disks 214A and 214B, respectively, as shown in FIG. 3B. Alternatively, the pressure sensing elements 212A and 212B may be slightly distant from the rotor disks 214A and 214B, respectively, as long as the distance between the pressure sensing element 212A and the rotor disk 214A and the distance between the pressure sensing element 212B and the rotor disk 214B are within the deformable ranges of the rotor disks 214A and 214B.

The principle of controlling lateral movement of the cursor according to the control signal generated from stirring actions of the scroll wheel assembly 21 will be illustrated with reference to FIGS. 3B and 3C. When an external force is applied on the soft member 211 leftwards (as shown in the arrow L), the rotor disk 214B is inclined to the left such that the pressure sensing element 212B is actuated by the rotor disk 214B to generate corresponding control signal for controlling the leftward movement of the cursor. Whereas, when an external force is applied on the soft member 211 rightwards (as shown in the arrow R), the rotor disk 214A is inclined to the right such that the pressure sensing element 212A is actuated by the rotor disk 214A to generate corresponding control signal for controlling the rightward movement of the cursor. Optionally, the sensing member 212 further includes an additional pressure sensing element 212C arranged on the top surface thereof and in contact with the central inner wall 211A of the soft member 211. Alternatively, the pressure sensing element 212C may be slightly distant from the inner wall 211A as long as the distance therebetween is within the deformable range of the soft member 211. Once the user depresses down the soft member 211 in the direction D, as shown in FIG. 3B, the soft member 211 is pressed down such that the pressure sensing element 212C is actuated to generate a setting signal for conducting other data processing operations.

A third embodiment of a pointing device is also communicable to a computer system or an electronic apparatus with a display screen, thereby controlling lateral movement of a cursor or scrolling an image on the display screen in response to a control signal. The scroll wheel assembly 31 used in this embodiment will be illustrated with reference to FIGS. 4A.about.4E. As shown in FIG. 4A, the scroll wheel assembly 31 comprises a rotatable member, a soft member 311 and a sensing member 312. The rotatable member includes two rotor disks 314A and 314B disposed on opposite sides of a shaft 313. The soft member 311 can be contacted by the user's finger. The sensing member 312 is arranged between the rotatable member and the soft member 311. Once the scroll wheel assembly 31 is fabricated as shown in FIG. 4B, the sensing member 312 and portions of the rotor disks 314A and 314B are covered by the soft member 311.

The sensing member 312 includes two pressure sensing elements 312A and 312B facing to and in contact with opposite inner walls 311A and 311B of the soft member 311, respectively. Alternatively, the pressure sensing elements 312A and 312B may be slightly distant from the inner walls 311A and 311B of the soft member 311, respectively, as long as the distance between the pressure sensing element 312A and the inner wall 311A and the distance between the pressure sensing element 312B and the inner wall 311B are within the deformable ranges of the inner walls 311A and 311B of the soft member 311. The principle of controlling lateral movement of the cursor according to the control signal generated from stirring actions of the scroll wheel assembly 31 will be illustrated with reference to FIGS. 4C and 4D. When an external force is applied on the soft member 311 leftwards (as shown in the arrow L), the pressure sensing element 312B is actuated by the inner wall 311B of the soft member 311 to generate corresponding control signal for controlling the leftward movement of the cursor. Whereas, when an external force is applied on the soft member 311 rightwards (as shown in the arrow R), the pressure sensing element 312A is actuated by the inner wall 311A of the soft member 311 to generate corresponding control signal for controlling the rightward movement of the cursor.

Optionally, the sensing member 312 further includes an additional pressure sensing element 312C arranged on the top surface thereof and in contact with the inner wall 311C of the soft member 311. Alternatively, the pressure sensing element 312C may be slightly distant from the inner wall 311C as long as the distance therebetween is within the deformable range of the soft member 311. Once the user depresses down the soft member 311 in the direction D, as shown in FIG. 4E, the soft member 311 is pressed down such that the pressure sensing element 312C is actuated to generate a setting signal for conducting other data processing operations.

From the above description, the pointing device of the present invention can be integrated with or applied to a keyboard, a mouse, a remote controller or any regular input device. In addition, the pointing device of the present invention is communicable to a computer system or an electronic apparatus with a display screen, for example a mobile phone, a personal digital assistant (PDA) or a notebook, so as to scroll an image on a display screen, control lateral movement of a cursor, and generate a setting signal conduct data processing operations such as dragging or selecting operations.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

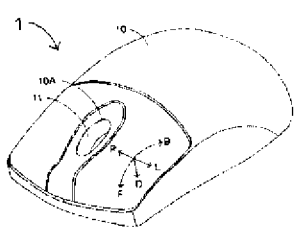

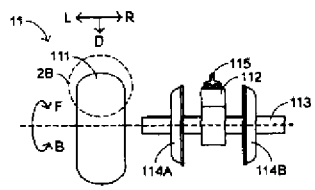

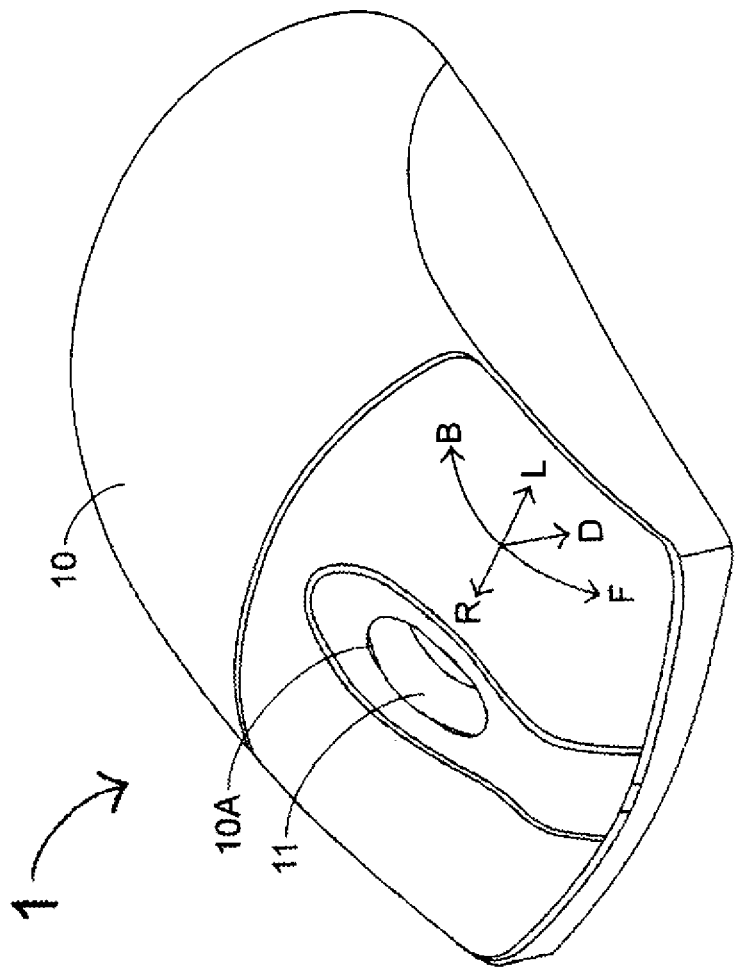

What is claimed is:

1. A pointing device, comprising:
   a housing having an opening therein;
   a shaft within the housing; and
   a scroll wheel assembly positioned within the opening of the housing and carried by the shaft, wherein a portion of the scroll wheel assembly protrudes away from an outer surface of the housing, and wherein the scroll wheel assembly comprises:
   a rotatable member;
   a soft member covering the rotatable member; and
   a sensing member arranged between the rotatable member and the soft member, wherein the sensing member is configured to detect a change in shape of the soft member in response to an external force,
   wherein all parts of the pointing device disposed between the shaft and the soft member rotate together.

2. The pointing device of claim 1, wherein the soft member is rotatable relative to the sensing member.

3. The pointing device of claim 1 wherein:
   the rotatable member includes two rotor disks disposed on opposite sides of the shaft;
   the sensing member is positioned between the two rotor disks; and
   the soft member extends circumferentially around the two rotor disks and between the two rotor disks.

4. The pointing device of claim 3, wherein the sensing member includes two pressure sensing elements facing toward opposite inner walls of the soft member, respectively.

5. The pointing device of claim 4, further comprising a pressure sensing element facing a central inner wall of the soft member.

6. The pointing device of claim 4, further comprising a lever member configured to engage with the pressure sensing member in response to the change of shape of the soft member.

7. The pointing device of claim 6 wherein the lever member is configured to engage with three generally coplanar pressure sensing members in response to the change of shape of the soft member.

8. The pointing device of claim 3 wherein the two rotor disks are composed of flexible material.

9. A pointing device for a computer system, the pointing device comprising:
   a housing having an opening therein;

a scroll wheel rotatably mounted to a shaft carried by the housing, and wherein the scroll wheel comprises:
a rotatable deformable member extending circumferentially around the shaft;
means for sensing a change in shape of a portion of the deformable member positioned outside the housing; and
means for sensing rotation of the scroll wheel,
wherein all parts of the pointing device disposed between the shaft and the deformable member rotate together.

10. The pointing device of claim 9, wherein the scroll wheel comprises two rotor disks rotatably mounted to the shaft and a soft member extending between the two rotor disks and circumferentially around the rotor disks.

11. The pointing device of claim 10, wherein the means for sensing is positioned between the two rotor disks.

12. The pointing device of claim 11, wherein the means for sensing comprises two lateral pressure sensing elements facing opposing portions of an inner surface of the deformable member.

13. The pointing device of claim 12, further comprising a pressure sensing element facing a central inner wall of the soft member.

14. The pointing device of claim 10 wherein, the two rotor disks are composed of flexible material.

15. A system, comprising:
an electronic apparatus including a display screen; and
a pointing device operably coupled to the electronic apparatus, wherein the pointing device comprises:
a housing having an opening therein;
a shaft within the housing; and
a scroll wheel assembly positioned within the opening of the housing and carried by the shaft, wherein a portion of the scroll wheel assembly protrudes away from an outer surface of the housing, and wherein the scroll wheel assembly comprises:
a rotatable member;
a soft member covering the rotatable member, and
a sensing member between the rotatable member and the soft member, wherein the sensing member is configured to detect a change in shape of the soft member responsive to an external force,
wherein all parts of the pointing device disposed between the shaft and the soft member rotate together.

16. The system of claim 15 wherein the electronic apparatus comprises a personal computer.

17. The system of claim 15 wherein the electronic apparatus comprises a notebook computer.

18. The system of claim 15 wherein the electronic apparatus comprises a personal digital assistant (PDA).

19. The system of claim 15 wherein the electronic apparatus comprises a mobile phone.

20. The system of claim 15 wherein:
the rotatable member comprises two rotor disks disposed on opposite sides of the shaft, and wherein the rotor disks are composed of a flexible material;
the sensing member is positioned between the two rotor disks, and wherein the sensing member comprises two pressure sensing elements facing toward opposite inner walls of the soft member, respectively; and
the soft member extends circumferentially around the two rotor disks and between the two rotor disks.

* * * * *

UNITED STATES PATENT AND TRADEMARK OFFICE
CERTIFICATE OF CORRECTION

PATENT NO. : 8,427,425 B2
APPLICATION NO. : 12/405835
DATED : April 23, 2013
INVENTOR(S) : Liu et al.

It is certified that error appears in the above-identified patent and that said Letters Patent is hereby corrected as shown below:

The title page showing the illustrative figure should be deleted to be replaced with the attached title page.

In the drawing sheets, consisting of Fig. 1, should be deleted to be replaced with the drawing sheet, consisting of Fig. 1, as shown on the attached pages.

In the Specifications:

In Column 2, Line 50, delete "a schematic" and insert -- is a schematic --, therefor.

In Column 3, Line 36, delete "wheel 11" and insert -- wheel assembly 11 --, therefor.

In Column 6, Line 4, delete "signal conduct" and insert -- signal to conduct --, therefor.

In the Claims:

In Column 6, Line 59, in Claim 7, delete "6" and insert -- 6, --, therefor.

In Column 6, Line 63, in Claim 8, delete "3" and insert -- 3, --, therefor.

In Column 7, Line 25, in Claim 14, delete "10 wherein," and insert -- 10, wherein --, therefor.

In Column 8, Line 7, in Claim 15, delete "member, and" and insert -- member; and --, therefor.

In Column 8, Line 14, in Claim 16, delete "15" and insert -- 15, --, therefor.

In Column 8, Line 16, in Claim 17, delete "15" and insert -- 15, --, therefor.

Signed and Sealed this
Sixteenth Day of July, 2013

Teresa Stanek Rea
*Acting Director of the United States Patent and Trademark Office*

In Column 8, Line 18, in Claim 18, delete "15" and insert -- 15, --, therefor.

In Column 8, Line 20, in Claim 19, delete "15" and insert -- 15, --, therefor.

CERTIFICATE OF CORRECTION (continued)

(12) United States Patent
Liu et al.

(10) Patent No.: US 8,427,425 B2
(45) Date of Patent: *Apr. 23, 2013

(54) POINTING DEVICES FOR CONTROLLING MOVEMENT OF A CURSOR IN A COMPUTER SYSTEM AND ASSOCIATED SYSTEMS

(75) Inventors: Sen-Hsiang Liu, Taipei (TW); Huang-Feng Huang, Dongguan (TW); Hai-Bing Fu, Dongguan (TW)

(73) Assignee: Transpacific Plasma, LLC, Wilmington, DE (US)

( * ) Notice: Subject to any disclaimer, the term of this patent is extended or adjusted under 35 U.S.C. 154(b) by 314 days.

This patent is subject to a terminal disclaimer.

(21) Appl. No.: 12/405,835

(22) Filed: Mar. 17, 2009

(65) Prior Publication Data
US 2009/0195502 A1 Aug. 6, 2009

Related U.S. Application Data

(63) Continuation of application No. 11/203,691, filed on Aug. 15, 2005, now Pat. No. 7,525,532.

(30) Foreign Application Priority Data

Jun. 24, 2005 (TW) .............................. 94121114 A

(51) Int. Cl.
*G09G 5/00* (2006.01)
*G06F 3/033* (2006.01)
(52) U.S. Cl.
USPC .................................. 345/156; 345/163

(58) Field of Classification Search .......... 345/156-167
See application file for complete search history.

(56) References Cited

U.S. PATENT DOCUMENTS

| | | |
|---|---|---|
| 5,428,368 A | 6/1995 | Grant |
| 5,691,747 A | 11/1997 | Amano |
| 6,198,473 B1 | 3/2001 | Armstrong |
| 6,348,913 B1 * | 2/2002 | Cho .................. 345/163 |
| 6,518,954 B1 * | 2/2003 | Chen .................. 345/161 |
| 6,879,316 B2 | 4/2005 | Kehlstadt et al. |
| 7,042,441 B2 | 5/2006 | Adams et al. |

(Continued)

FOREIGN PATENT DOCUMENTS

TW I267772 12/2006

OTHER PUBLICATIONS

United States Patent and Trademark Office, Non-Final Office Action, U.S. Appl. No. 11/203,691, mailed Aug. 5, 2008, 10 pages.

(Continued)

*Primary Examiner* — Rodney Amadiz

(57) ABSTRACT

A pointing device is communicated with a computer system for controlling movement of a cursor shown on a display screen of the computer system. The pointing device includes a housing and a scroll wheel assembly. The housing has an opening therein. The scroll wheel assembly is positioned within the opening of the housing and a portion thereof protrudes away from the outer surface of the housing. The scroll wheel assembly includes a rotatable member, a soft member covering the rotatable member, and a sensing member arranged between the rotatable member and the soft member. The sensing member is actuated in response to deformation of the soft member when a lateral force is applied on the soft member, thereby controlling lateral movement of the cursor.

20 Claims, 4 Drawing Sheets